United States Patent [19]

Ito et al.

[11] Patent Number: 4,677,450
[45] Date of Patent: Jun. 30, 1987

[54] AUTOMOTIVE NAVIGATION SYSTEM

[75] Inventors: Hisatsugu Ito; Kousaku Uota, both of Himeji, Japan

[73] Assignee: Mitsubishi Denki Kabushiki Kaisha, Japan

[21] Appl. No.: 711,836

[22] Filed: Mar. 14, 1985

[30] Foreign Application Priority Data

Mar. 19, 1984 [JP] Japan .................................. 59-52934

[51] Int. Cl.$^4$ ............................................ G06F 15/50
[52] U.S. Cl. .................................. 364/449; 364/521; 340/988; 340/995; 73/178 R
[58] Field of Search .............. 364/443, 449, 460, 521; 340/988, 995; 343/451; 73/178 R; 342/451

[56] References Cited

U.S. PATENT DOCUMENTS

| 4,513,377 | 4/1985 | Hasebe et al. | 364/521 |
| 4,535,335 | 8/1985 | Tagami et al. | 340/995 |
| 4,543,572 | 9/1985 | Tanaka et al. | 340/995 |
| 4,571,684 | 2/1986 | Takanabe et al. | 340/995 |

FOREIGN PATENT DOCUMENTS 58-146814 9/1983 Japan .

OTHER PUBLICATIONS

"Cathode-Ray Tube Information Center with Automotive Navigation", published in SAE Technical Paper Series 840313, by M. W. Jarvis and R. C. Berry.
"On-Board Computer System for Navigation, Orientation, and Route Optimization", published in SAE Technical Paper Series 840485 by P. Haeussermann.

Primary Examiner—Gary Chin
Attorney, Agent, or Firm—Leydig, Voit & Mayer

[57] ABSTRACT

An automotive navigation system wherein a memory included therein has not stored therein a picture information of a map itself but instead has stored therein geographical names and positional information thereof. When the geographical names of a departure point and a destination point are entered through an input unit, a control unit reads out from the memory the geographical names and the positions of the points. A CRT displays marks respectively indicating the departure point, the destination point, and the current position of a vehicle on an adequately reduced scale on the display scope. The arrangement of this automotive navigation system can perform a fully practical navigation function even with a small sized and cheap memory and arithmetic unit.

4 Claims, 24 Drawing Figures

FIG. 5

"Kana" TABLE

| | A | I | U | E | O | DEFINITION OF SOUND |
|---|---|---|---|---|---|---|
| "0" | A | I | U | E | O | CLEAR SOUND |
| "1" | KA | KI | KU | KE | KO | CLEAR SOUND |
| "2" | SA | SHI | SU | SE | SO | CLEAR SOUND |
| "3" | TA / TSA | CHI / TI | TSU / TU | TE / TSE | TO / TSO | CLEAR SOUND |
| "4" | NA | NI | NU | NE | NO | CLEAR SOUND |
| "5" | HA / FA | HI / FI | FU | HE / FE | HO / FO | CLEAR SOUND |
| "6" | MA | MI | MU | ME | MO | CLEAR SOUND |
| "7" | YA | | YU | | YO | CLEAR SOUND |
| "8" | RA | RI | RU | RE | RO | CLEAR SOUND |
| "9" | WA | | | | | CLEAR SOUND |
| | GA | GI | GU | GE | GO | VOICED SOUND |
| | ZA | JI | ZU | ZE | ZO | VOICED SOUND |
| | DA | JI / DI | ZU / DU / DYU | DE | DO | VOICED SOUND |
| | BA | BI | BU | BE | BO | VOICED SOUND |
| | PA | PI | PU | PE | PO | SEMI-VOICED SOUND |
| | KYA | | KYU | | KYO | CONTRACTED SOUND |
| | SHA | | SHU | SHE | SHO | CONTRACTED SOUND |
| | CHA | | CHU | CHE | CHO | CONTRACTED SOUND |
| | NYA | | NYU | | NYO | CONTRACTED SOUND |
| | HYA | | HYU / FYU | | HYO | CONTRACTED SOUND |
| | MYA | | MYU | | MYO | CONTRACTED SOUND |
| | RYA | | RYU | | RYO | CONTRACTED SOUND |
| | GYA | | GYU | | GYO | VOICED CONTRACTED SOUND |
| | JA | | JU | JE | JO | VOICED CONTRACTED SOUND |
| | BYA | | BYU | | BYO | VOICED CONTRACTED SOUND |
| | PYA | | PYU | | PYO | SEMI-VOICED CONTRACTED SOUND |
| N | | | | | | |

AUTOMOTIVE NAVIGATION SYSTEM

BACKGROUND OF THE INVENTION

This invention relates to an automotive navigation system, and in particular to an automotive navigation system wherein a departure point, a destination point, and the current point of a vehicle are displayed with respective marks on a display such as a cathode ray tube.

Such an automotive navigation system has been already proposed in Japanese Patent Application Laid-open No. 58-146814. This conventional system detects the running distance and the heading of a vehicle, and computes the current position of the vehicle from those information. This system also displays picture information of a map read out from a memory on the display such as a CRT while displaying the mark indicating the current position of the vehicle which is computed on the display, whereby a driver can determine the current position of the vehicle from the map and the mark imaged on the display.

However, since the picture information of a map is extremely numerous in regards to the amount of information therein, the quantity of information stored must be restricted so that it can be stored in a small-sized and cheap memory suitable for a vehicle. In a case where the departure point and the destination point are predetermined, even though a map stored in the memory is displayed on the display and a mark indicating the current position of the vehicle is displayed in a superposed manner, a change in the current position may often be limited to a very small portion of the scope of the display. Furthermore, if the distance between the departure point and the destination point is far so as to require a plurality of maps, it is hard to grasp the entire running route.

Although it is not necessarily impossible to solve these technical problems with a memory having a large capacity as well as a high speed arithmetic device, the size of the whole system becomes very large so that it is difficult to mount the same on the vehicle.

On the other hand, there have been disclosed, "Cathode-Ray Tube Information Center with Automotive Navigation" published in SAE Technical Paper Series 840313 by M. W. Jarvis and R. C. Berry, and "On-Board Computer System for Navigation, Orientation, and Route Optimization" published in SAE Technical Paper Series 840485 by P. Haeussermann. Both publications are based on International Congress & Exposition held in Detroit, Mich. on Feb. 27–Mar. 2, 1984. In the former literature, an approximate position of a vehicle is determined from the communication with a satellite, and a more accurate position is determined and displayed on CRT by means of a self-contained navigation using an earth magnetism sensor in the vehicle. The latter literature discloses a composite system of a route guide system in trunk highways using distance information and a destination indicating system within a city using distance information and heading information.

SUMMARY OF THE INVENTION

It is accordingly an object of the present invention to provide an automotive navigation system wherein a memory included therein has not stored therein picture information of a map itself but instead has stored therein geographical names and the positional information thereof. When the geographical names of the departure point and the destination point are entered through an input unit, a control unit reads out from the memory the respective geographical names and positions of the points. A display means displays marks indicating the departure point, the destination point, and the current position of a vehicle on an adequately reduced scale on the display scope. This arrangement of an automotive navigation system can perform a fully practical navigation function even with a small sized cheap memory and arithmetic unit.

In order to accomplish this object, an automotive navigation system according to this invention, broadly, comprises a running distance detecting means for detecting the running distance of a vehicle; a vehicle heading detecting means for detecting the vehicle heading of the vehicle; a display means for enabling a planar display based on the two dimensional Cartesian coordinates system; a storage means for storing information comprising a geographical name and the positional information thereof for each of a plurality of points; a character keyboard means including a plurality of character keys respectively assigned a group of unit characters; and a control means for computing the current position of the vehicle on the basis of the output signals of the running distance detecting means and the vehicle heading detecting means, for retrieving from said storage means one or more geographical names on the basis of the order in which the character keys are activated, for designating from among the retrieved geographical names the geographical name of a departure point and a destination point and reading out their corresponding positional information from the storage means, and for causing the display means to display as marks the departure point, the destination point, and the current position of the vehicle in a reduced scale determined by the departure and destination points at corresponding coordinates on the display means.

The control means preferably comprises a current position computing means for computing the current position of the vehicle from the running distance detected by the running distance detecting means and the vehicle heading detected by the vehicle heading detecting means; a current position initializing means for initializing the current position of the vehicle for the current position computing means; a geographical name entering means for entering, by the activation of the character keys, information corresponding to the geographical name of a point which an operator desires; a point information retrieval means for retrieving geographical names from the point information storage means, based on the combinations and the order that the character keys are activated causing the display means to display all of the geographical names corresponding to the inputted combinations so that the operator may select one of them to determine the desired geographical name in a case where a plurality of the geographical names are retrieved, and reading out and setting the positional information of the selected geographical name; a point setting means for setting the departure point and the destination point provided by the point information retrieval means; and a mark displaying control means for determining the distance and the positional relationship between the departure and destination points from the positional information of both points provided by the point setting means and causing the display means to display the marks respectively representative of the positions of both points based on the determined distance and positional relationship, whereby on the reduced scale determined by the departure and destination points a mark representative of the current position of the vehicle is displayed on the display means.

The point information stored in the storage means may be divided into a name portion representing the geographical name and an attribute portion representing the attribute of the geographical name, the geographical name entering means including means for entering information corresponding to one or more the name portions, the point information retrieval means including means for retrieving all of the name portions corresponding to said entered information, means for causing the display means to display all of the name retrieved portions if there are a plurality of name portions corresponding to the entered information, and means for causing the display means to further display the attributive portion of geographical names having identical name portions so that the operator may select one of the retrieved name portions to determine the departure or destination point.

The storage means preferably includes means for storing the point information divided into predetermined areas whereby an area is first designated and the geographical name within the area is entered so that the corresponding positional information may be retrieved from the storage means.

BRIEF DESCRIPTION OF THE DRAWINGS

The present invention will be readily apparent from the embodiments illustrated in the accompanying drawings in which:

FIG. 5 shows a table of Japanese "Kana" alphabet;

Throughout the figures, the same reference numerals indicate identical or corresponding portions.

DETAILED DESCRIPTION OF THE PREFERRED EMBODIMENTS

Figure 1:
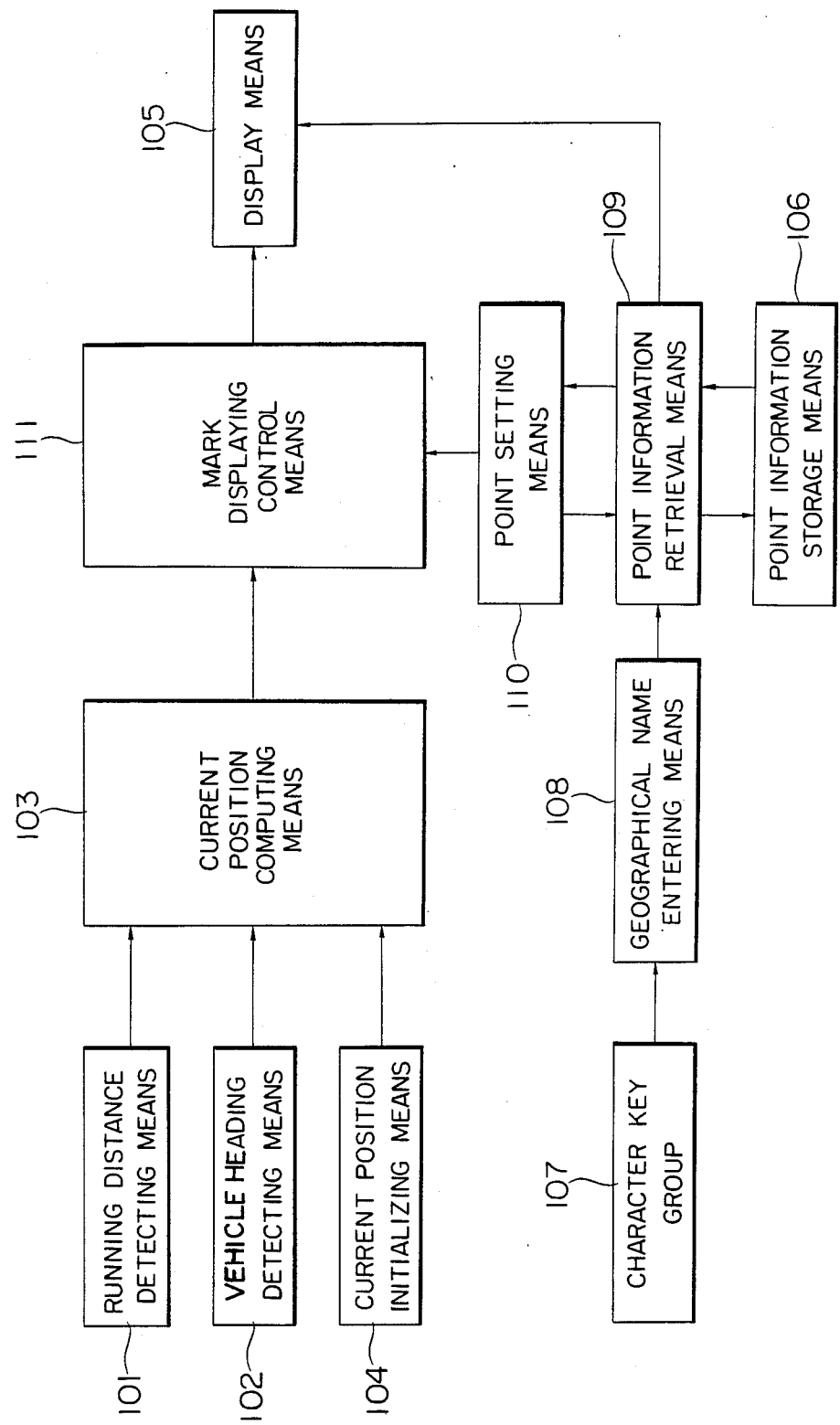
FIG. 1 shows a functional block diagram of a basic arrangement of an automotive navigation system in accordance with this invention.

Referring now to the drawings, in particular FIG. 1, there is shown one embodiment of an automotive navigation system according to this invention. This embodiment schematically shows a functional block diagram of this invention. In the figure, the outputs of a detection means 101 for detecting the running distance of a vehicle, and a detection means 102 for detecting the heading of the vehicle are connected to the inputs of a computing means for computing the current position of the vehicle from the running distance provided by the detection means 101 and the heading provided by the detection means 102. An initializing means 104 is provided for initially setting the current position of the vehicle for the computing means 103. A display means 105 is able to make a planar display on the two-dimensional Cartesian coordinates. A point information storage means 106 has stored therein information representative of a plurality of points each consisting of the geographical name and the position information, respectively. A character key group 107 consists of a plurality of keys which are respectively assigned a plurality of unit characters. A geographical name entering means 108 the input of which is connected to the output of said character key group 107 serves to enter each unit character forming the geographical name of a point, which an operator registers, corresponding to each one of the character keys. The output of the entering means 108 is connected to the input of a point information retrieval means 109 which retrieves a corresponding geographical name from the storage means 106 on the basis of the combination of unit character rows defined by the order in which the character keys entered by the entering means 108. If a plurality of geographical names correspond to the combination entered, the retrieval means 109 causes the display means 105 to display all of the corresponding names so that the operator may select the actually desired geographical name. This system enables the character key group 107 to have a minimal number of keys while still allowing the operator to select and enter any geographical name desired. The retrieval means 109 sets this geographical name. The retrieval means 109 is interconnected to a point setting means 110 which sets a departure point and a destination point through the character key group 107. From the position information of the departure and the destination points set by the setting means 110, a mark displaying control means 111 connected to the setting means 110 determines the distance between both points and the positional relationship therebetween, whereby marks respectively indicative of the positions of both points are displayed on the scope of the display means 105. On the basis of the reduced scale determined by both points, the control means 111 causes the display means 105 to display a mark indicative of the current position of the vehicle on the scope of the display. As a result, it becomes possible to determine the approximate position of the vehicle while driving, from the positional relationship of the mark indicative of the departure point, the destination point, and the current position of the vehicle displayed on the scope.

Figure 2:
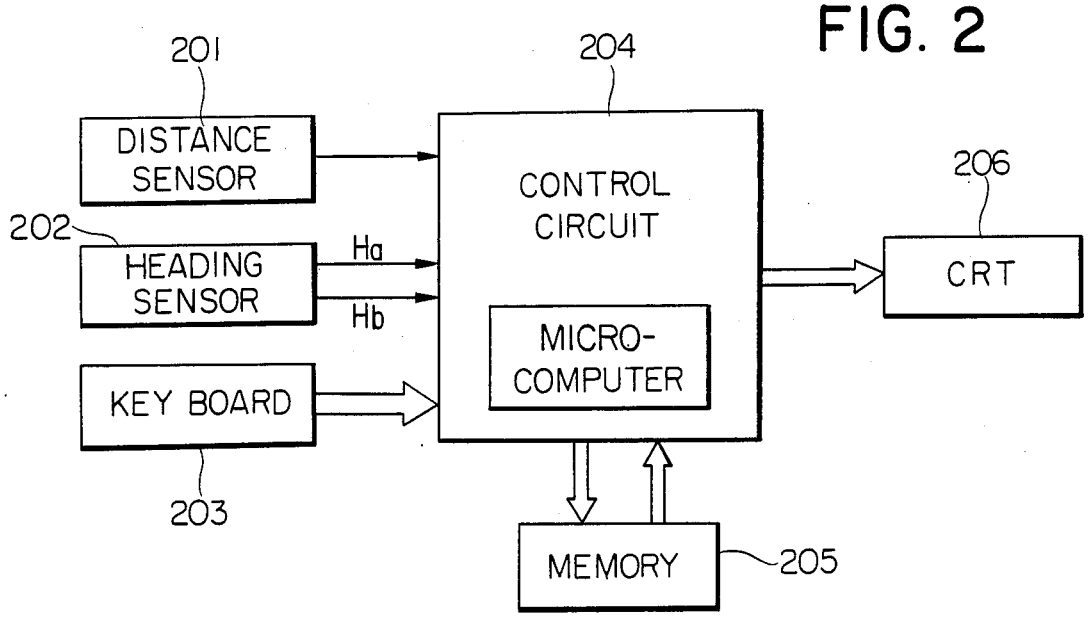
FIG. 2 shows a hardware block diagram corresponding to the arrangement of FIG. 1.

The functional arrangement of this invention shown in FIG. 1 is specifically shown in FIG. 2 in the form of hardware. It is seen from FIG. 22 that the hardware of this invention is formed of a running distance sensor 201, a vehicle heading sensor 202, a key board 203, a control circuit 204, a semiconductor memory 205 and a CRT 206. The distance sensor 201 detects the rotational speed of a vehicle wheel by means such as an electromagnetic pickup or a reed switch, and outputs pulses the frequency of which is proportional to the rotational speed of the vehicle wheel. The direction sensor 202 detects the earth magnetism [H] (vector) being decomposed into a heading component Ha and the normal component Hb which is perpendicular to Ha by means such as an earth magnetism detector of a flux-gate type which is fixed on the vehicle 301.

Figure 4:
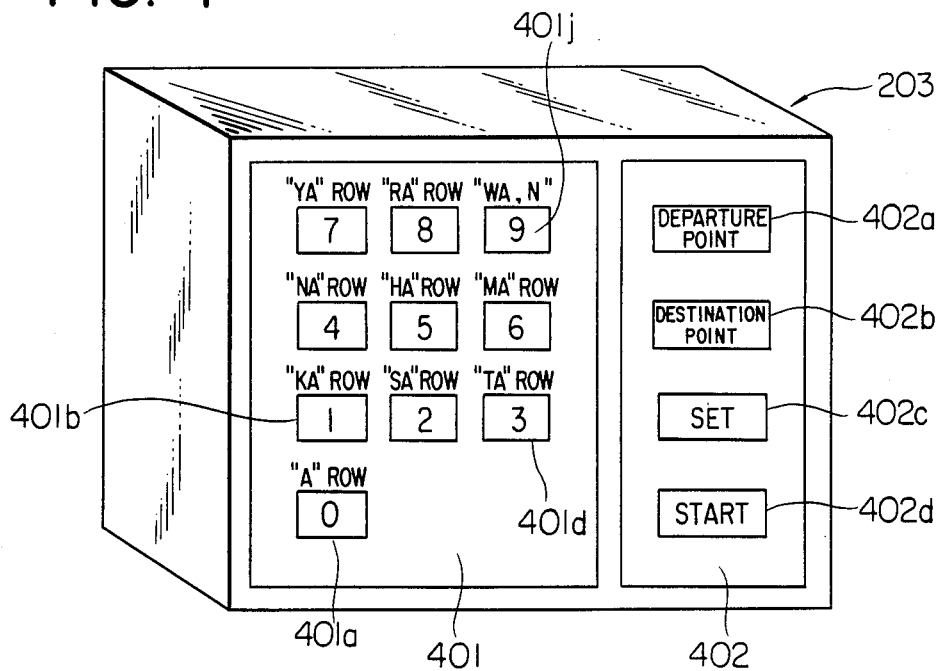
FIG. 4 shows an exterior view of a key board used in FIG. 2.

As illustrated in FIG. 4, the key board 203 includes a character key group 401 and a control key group 402. The character key group 401 consists of ten character keys 401a to 401j which are representative of the "A" to "N" Japanese alphabet called "Kana" as well as the Arabic numerals "0" to "9". The control key group 402 consists of control keys 402a to 402d respectively indicative of a "DEPARTURE POINT", "DESTINATION POINT", "SET", and "START" functions.

Hereupon, Japanese alphabet "Kana" will be described. As shown in FIG. 5, the Japanese "Kana" alphabet is represented by Roman characters and comprises 45 unit characters from "A" to "N" (or "a" to "n") in which rows are respectively called "A" row, "KA" row, "SA" row, "TA" row, "NA" row, "HA" row, "MA" row, "YA" row, "RA" row and "WA" row, as also shown in FIG. 4. Since the "WA" row only comprises the "WA" character, and the "N" row only comprises the "N" character, the activation of the key 401j allows to register both the "WA" and "N" characters. Accordingly, in retrieving a geographical name, only names which begin with the "WA" character or "N" character will be retrieved, not to mention that these retrieved names must also satisfy all the other inputted characters which define the full geographical name. It should be noted that while, for example, "TA" is represented by two Roman characters, it actually corresponds to one Japanese "Kana" character.

Referring back to FIG. 4, the character key 401a may be called "0" key or "A" key, and the remaining keys 401b–401j are similarly designated to represent the remaining "Kana" characters. Also, the control key 402a may be called "DEPARTURE" key, and the remaining keys 402b–402d are similarly designated. The semiconductor memory 205 is composed of, for example, a ROM (Read Only Memory) which has stored therein point information consisting of geographical information (i.e. city names, town names, etc.) and the position information thereof.

Figure 6:
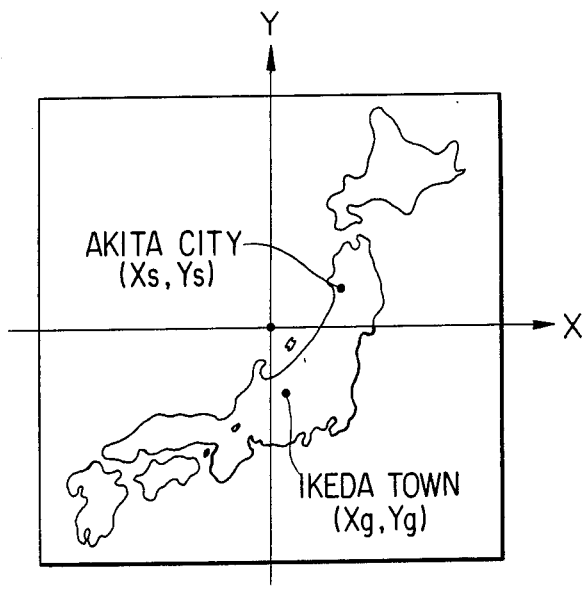
FIG. 6 shows a relationship between a map and the coordinates.
Figure 7:
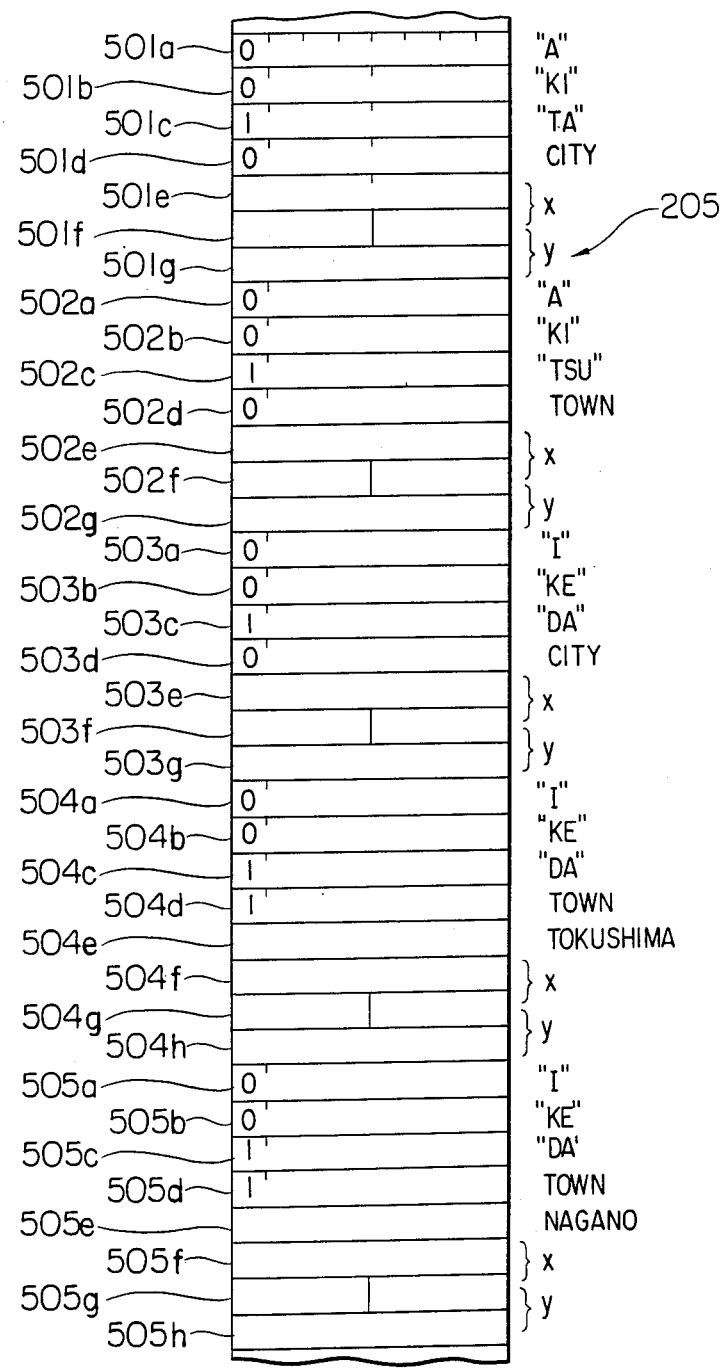
FIG. 7 shows a memory map of a semiconductor memory used in FIG. 2.

For example, the city hall of AKITA (Akita) City in Japan shown in FIG. 6 is situated about at 140°07′ East Longitude and at 39°43′ North Latitude. This point information is stored in memories 501a–501g in a memory map illustrated in FIG. 7. In this memory map, "AKITA City" as a geographical information is divided into one portion of "AKITA" indicative of the geographical name and the other portion of "CITY" indicative of the attribute of the geographical name. As to the name portion "AKITA", the codes respectively indicative of the "Kana" characters "A", "KI", and "TA" are sequentially stored at the memories 501a–501c, respectively, while the code for the attribute portion "CITY" is stored in the address 501d. It is to be noted that each of the memories comprises 8 bits. The most significant bit of each of the memories 501a–501c for storing geographical names serves to indicate the geographical name portion in which the memory 501c having stored the last character of the name portion is assigned "1" while the other memories 501a and 501b are assigned "0", as shown in FIG. 7. Therefore, the remaining seven bits of each of the memories 501a–501c represent a "Kana" character. With seven bits, it is possible to express all of the "Kana" characters having a clear sound, a voiced sound, a semi-voiced sound, a double sound, and a contracted sound, as illustrated in FIG. 5. The most significant bit of the memory 501d having stored therein the digital code indicative of the attribute portion serves to discriminate identical (or identical sound) names in which the MSB of "0" indicates that there is no identical geographical name and the MSB of "1" indicates that there are other identical geographical names, as will be described later in detail.

Memories 501e–501g serve to store positional information in which 8 bits of the memory 501e and the more significant 4 bits of the memory 501f forming a total of 12 bits are utilized to store the east longitude while the remaining less significant 4 bits of the memory 501f and 8 bits of the memory 501g forming a total of 12 bits are utilized to store the north latitude.

To obtain the positional information, coordinate axes X and Y may be set for the convenience's sake as shown by the map of Japan in FIG. 6 whereby coordinates (x, y) represeted by the relative distance on the basis of the coordinate axes may be stored. In this case, Japan is divided into 1700 Km squares in which this 1700 Km length is assigned the above mentioned 12 bits. Therefore, 1 bit is assinged about 415 m which results in a practical unit.

Meanwhile, there exist about 680 cities all over Japan while by preparing about 300 geographical names including the names of wards, towns, villages, interchanges, stations, castles, lakes, passes, mountains, and peaks per one perfecture, about 13,800 geographical names should be prepared in total for 46 divisions of Japan (including one Metropolitan District and 45 prefectures but not including Okinawa Prefecture). Supposing that the number of characters of the name portion of a geographical name is five on the average, one point information requires 9 bytes so that 124,200 bytes are required to store 13,800 points of Japan.

In order to store the information of 13,800 points, there are required four ROM's each of which has the maximum storage capacity of 256K bits as commercially available at present. However, with ROM of 1M bit which is expected to be commercially available in the near future, only one ROM would be sufficient, in which a small-sized, light, and highly reliable semiconductor memory can be utilized.

Figure 8:
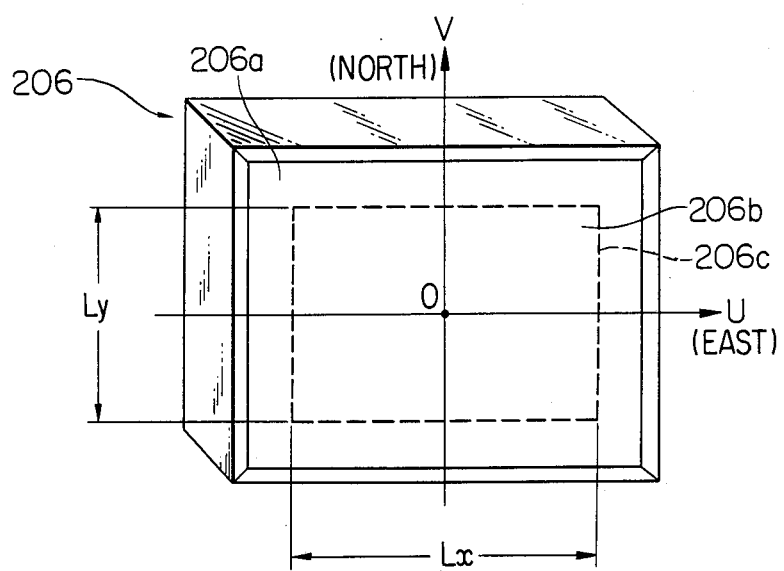
FIG. 8 shows an exterior view of a cathode ray tube used in FIG. 2.

The CRT 206 may comprise a conventional one and is assumed to have a rectangular scope 206a as shown in FIG. 8. It should be noted that coordinate axes U and V are perpendicular to each other to indicate coordinates (u, v) in the scope 206a on which various messages including the marks of a departure point, a destination point, and the current position are displayed as will be described later in detail. The control circuit 204 comprises a well known micro-computer system, includes various I/O interface circuits (not shown), computes the current position of a vehicle on the basis of the output signals of the direction sensor 202 and the distance sensor 201, inputs geographical names on the basis of orders supplied to the key board 203 by the operator, retrieve the geographical names and the coordinates from the output of the semiconductor memory 205, and causes the display 206 to display the departure point, the destination point, and the current position on the corresponding coordinates on the scope 206a of the CRT 206.

The operation of the control circuit 204 will then be described in detail with reference to flow charts illustrated in FIGS. 9A–9G.

Figure 9A:
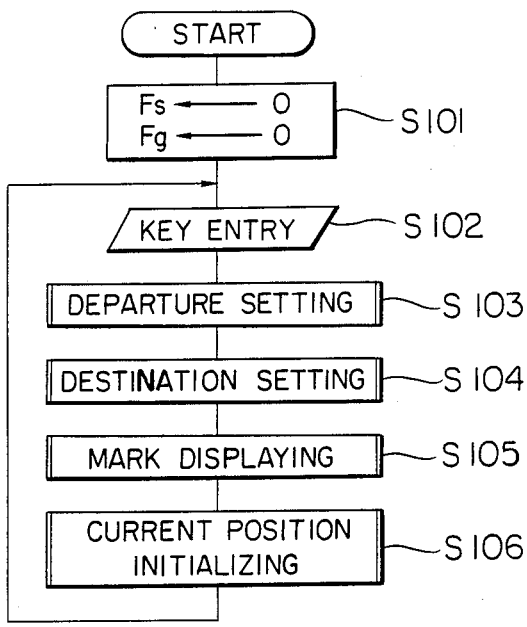
FIGS. 9A-9G respectively show flow charts of programs executed in a control circuit used in FIG. 2.

FIG. 9A illustrates the flow chart of a main routine of the program used for the control circuit 204. This general flow chart is started by an operation such as an electrical supply operation for the control circuit 204. At Step S101, memories Fs and Fg which will be described later are cleared, and then, Step 102, a subroutine S103 for the setting process of the departure point, a subroutine S104 for the setting process of the destination point, a subroutine S105 for the displaying process of the departure and the destination points, and a subroutine S106 for the initializing process of the current position are executed repeatedly. More specifically, an operator determines, first of all, a departure point and enters it. For example, if "AKITA CITY" is selected as a departure point, the key board 203 of FIG. 4 is operated in the sequence of the keys 402a ("DEPARTURE POINT"), 401a ("A" row), 401b ("KA" row), 401d ("TA" row), and 402c ("SET"). Consequently, by the subroutine S103 illustrated in FIG. 9B, a comment "DEPARTURE POINT" is displayed on the CRT 206 at Step S202 of FIG. 9B if it has been determined at Step S201 that the "DEPARTURE POINT" key 402a is selected. Then, at Step S203, "1" is set in the memory Fs, whereby the data of the departure point is ready to be entered. Therefore, each time a single character key is depressed, Step S210 for processing the character key will be executed to store and display the entered character.

Figure 10A:
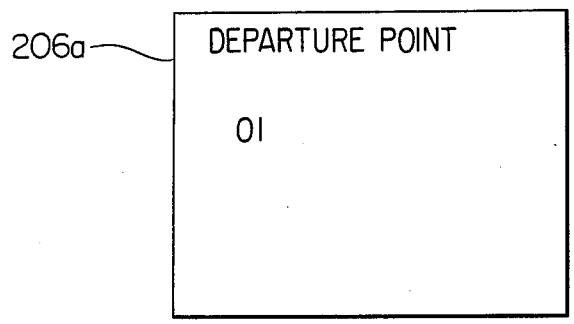
FIGS. 10A-10G respectively show various displayed examples of the CRT when the flow charts in FIGS. 9A-9G are executed.

FIG. 10A shows one example of a display up to a time point when the key 401b ("KA" row) is depressed. In this figure, numerals "0" and "1" respectively indicate that the key 401a ("A" row) assigned number "0" which is not related to the key 401a has been depressed and the key 401b ("KA" row) assigned number "1" which is not related to the key 401b has been depressed. Finally, the depression of the key 402c ("SET") indicating the completion of the entry of the character keys is determined at Step S205, and if the answer is "YES", then a subroutine S206 for the retrieving processing of the point information is executed.

Figure 9B:
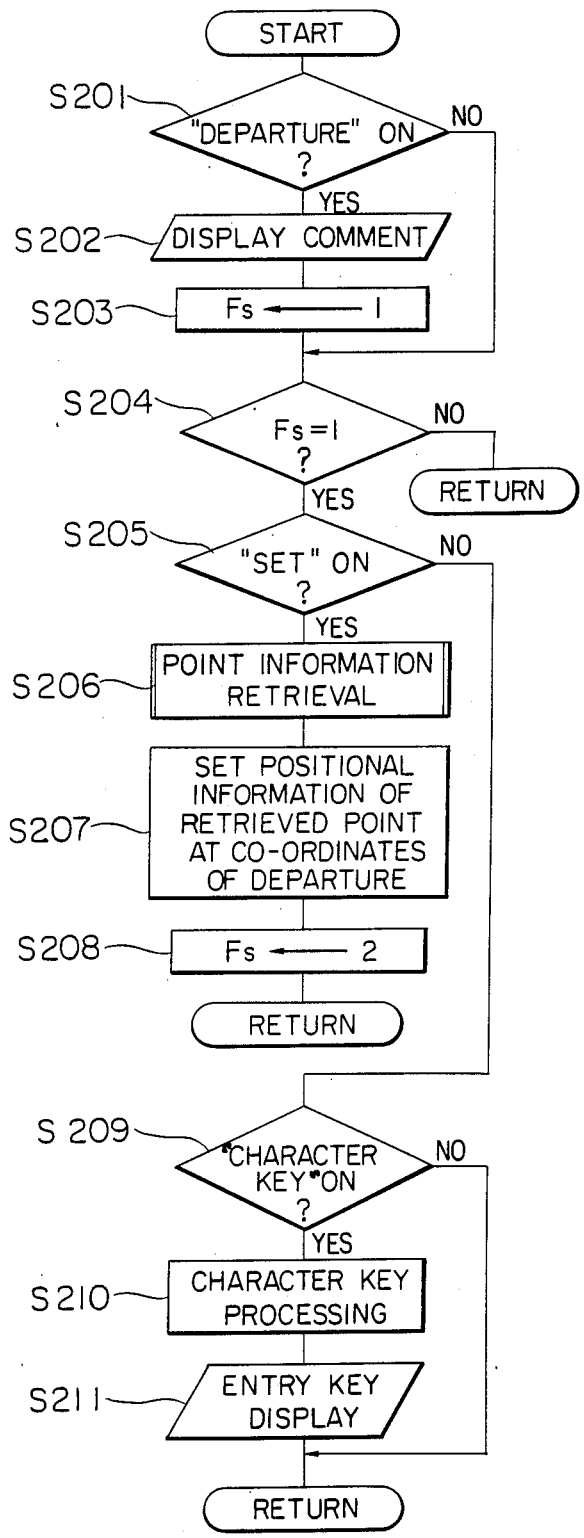
Figure 9C:
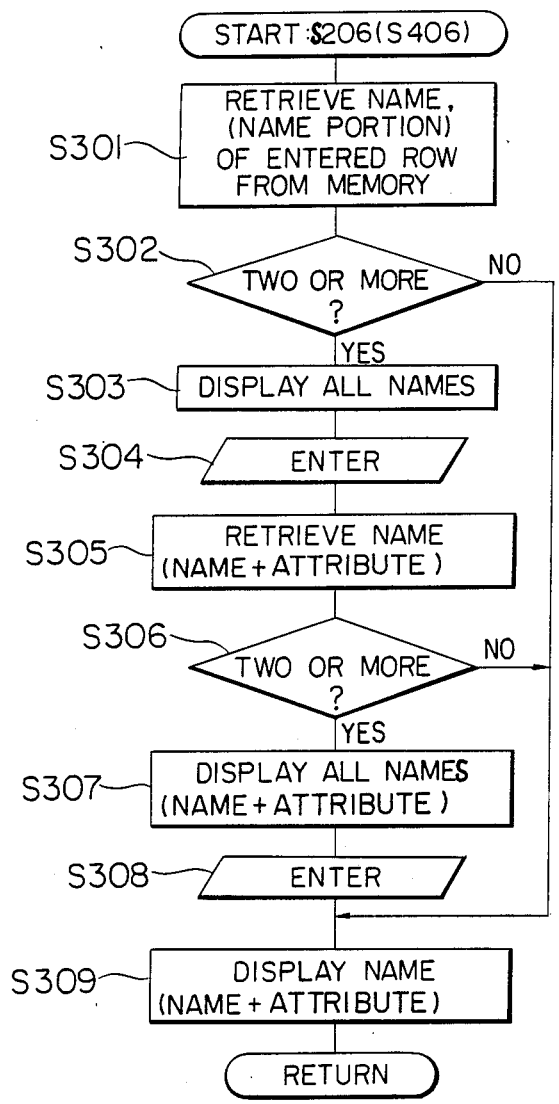

The flow chart of the subroutine S206 is illustrated in FIG. 9C. In the figure, the geographical name, particularly the name portion, corresponding to the row of the entered character is retrieved from the semiconductor memory 205 at Step S301. In this example, since "A", "KA", and "TA" rows as character rows have been entered, all of the point information having the name portion which consists of three characters (three Japanese Kana characters) which respectively belongs to the "A", "KA", and "TA" rows (including voiced sounds and double sounds) in this order are read out from the memory 205. As a result, if only one name portion is read out, the program jumps from Step S302 to Step 309 in which the geographical name having said name portion is displayed on CRT 206. However, it is assumed in this example that for the corresponding name portion, three name portions of "AKITA", "AKITSU" (e.g. Akitsu Town in Hiroshima Prefecture), and "IKEDA" (e.g. Ikeda City in Osaka Prefecture) have been retrieved. It should be noted that the point information on Akitsu Town and Ikeda City are respectively stored in the memories 502a–502g and 503a–503g in FIG. 7. Therefore, it is determined at Step S302 that there are a plurality of corresponding name portions, and at Step S303 all of the name portions are displayed.

Figure 10B:
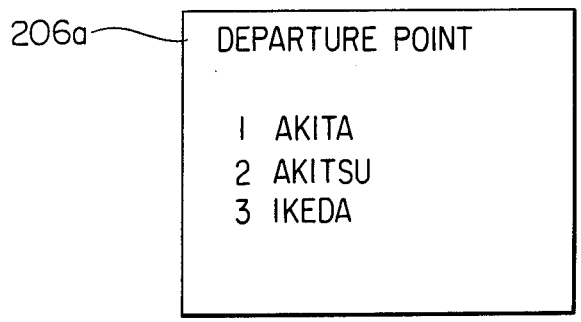

This displayed example is shown in FIG. 10B wherein those name portions are attached with consecutive numbers 1, 2, and 3.

Figure 10C:
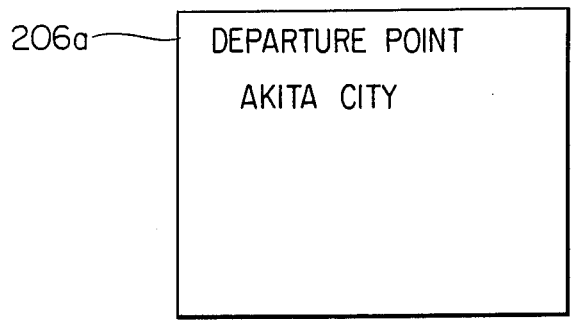

The operator then chooses the name portion of the city appearing in the name portion which he desires by activating the corresponding key (i.e. as represented by numbers 0–9 on the keys 401a–401j, respectively, which the name of the city he desires is represented by) (Step S304). Namely, if he depresses the key "1" (401b), the name portion will be set to "AKITA", and then at Step S305 a geographical name having "AKITA" in the name portion is retrieved. If it is determined at Step S306 that only one geographical name having "AKITA" in the name portion as in this example exists, the program jumps to Step S309 to display the geographical name. The displayed example is shown in FIG. 10C.

Thus, the execution of the subroutine S206 for retrieving the point information has been completed, whereas Steps S307 and S308 will be described later, and the program returns to Step S207 in FIG. 9B. At Step S207, the positional information is read out from the point information defined in the subroutine S206 and set as the coordinates (Xs, Ys) of the departure point. Namely, the positional information stored in the memories 501e–501g is stored in a memory region of the memory representing the coordinates (Xs, Ys). Then, at Step S208, "2" is set in the memory Fs, indicating that the departure point has been set. As in the foregoing, the execution of the subroutine S103 in FIG. 9A for setting the departure point has been completed.

Figure 9D:
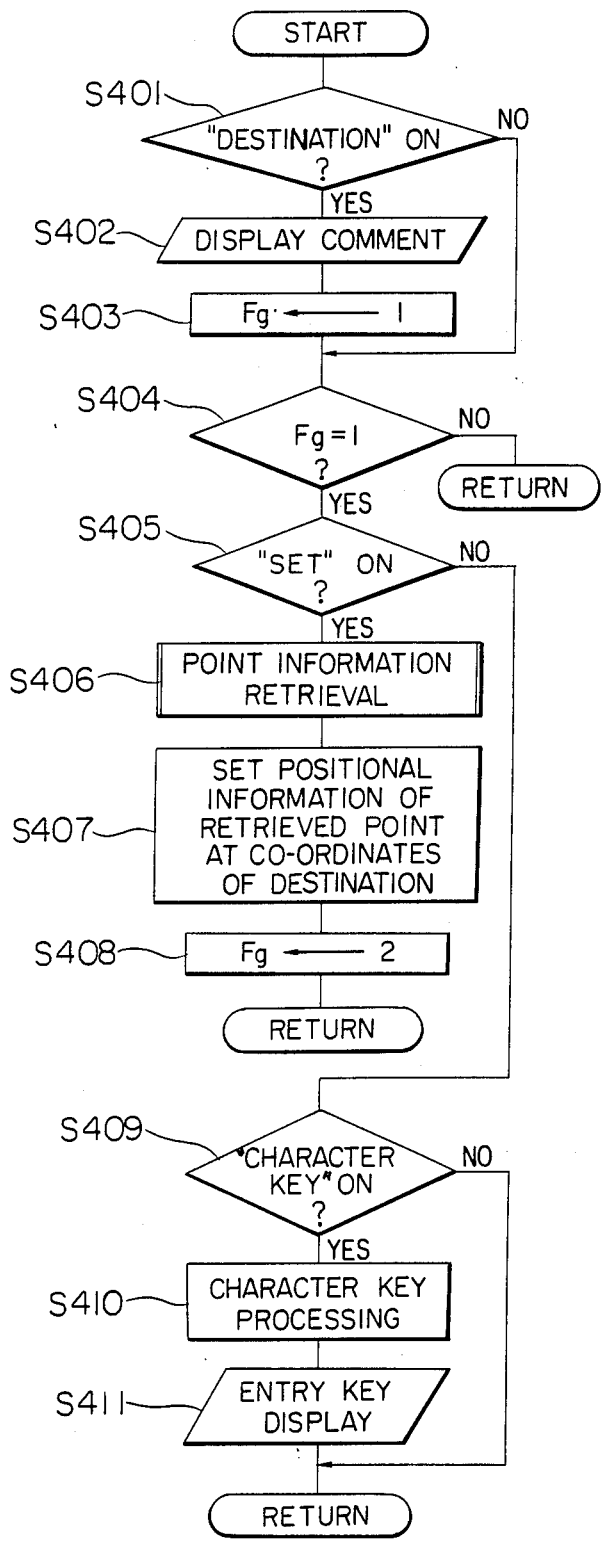

Now, in FIG. 9A, the subroutine S104 for the setting processing of the destination point will be executed. FIG. 9D shows the flow chart of this subroutine in which the case where Ikeda Town (of Nagano Prefecture) is set as a destination point is described.

After having depressed the "DESTINATION POINT" key (402b), when the operator sequentially depresses the keys of the "A" row (401a), the "KA" row (401b), the "TA" row (401d), and the "SET" (402c) in this order, the similar processing to the subroutine S103 will be carried out at Steps S401–S406, as shown in FIG. 9D.

Figure 10D:
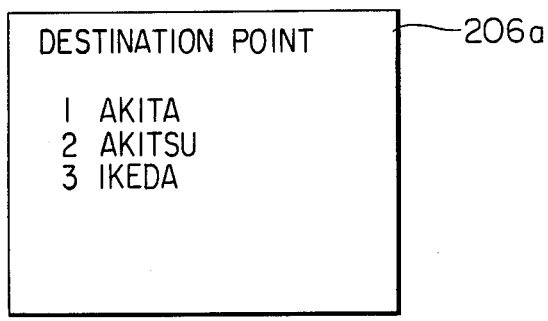

Namely, by similarly executing Step S303 in FIG. 9C illustrating the flow chart of the subroutine S406, a display shown in FIG. 10D is displayed on the CRT 206. It should be noted that Step S401 in FIG. 9D determines the operation of the key of "DESTINATION POINT" (402b) rather than the key of "DEPARTURE POINT" (402a) at Step S201 in FIG. 9B, Step S402 displays "DESTINATION POINT" rather than "DEPARTURE POINT" at Step S202, and Fg's at Steps S403, S404, and S408 respectively correspond to Fs's at Steps S203, S204, and S208. Furthermore, the subroutine S206 is quite the same as the subroutine S406.

Figure 10E:
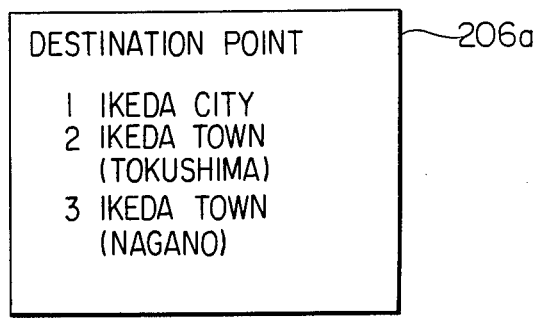
Figure 10F:
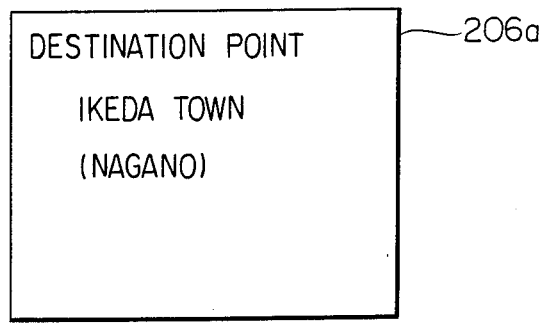

When the operator depresses the "3" key (401d) while seeing the display of FIG. 10D, an order is entered at Step S304 in FIG. 9C whereby the geographical name having "IKEDA" in the name portion is retrieved at Step S305. In this example, it is assumed that there are three geographical names, having "IKEDA" in the name portion, which represents "IKEDA CITY" (in Osaka Prefecture), "IKEDA TOWN" (in Tokushima Prefecture), and "IKEDA TOWN" (in Nagano Prefecture). The point information of these names are respectively stored in the memories 503a–503g, 504a–504h, and 505a–505h in FIG. 7. Although there is only one geographical name of "IKEDA CITY", there are two geographical names of "IKEDA TOWN" so that in order to distinguish both names, the memories 504e and 505e have respectively stored therein the respective codes of the prefectures which both names belong respectively. The presence/absence of the memories 504e and 505e indicative of these codes is determined by the most significant bits respectively of the memories 504d and 505d for the attribute of the name, as above described. Therefore, it is determined at Step S306 that there are a plurality of geographical names having the corresponding name portion, and then at Step S307 all of these geographical names are displayed. FIG. 10E shows one example to be displayed in which those two geographical names of "IKEDA TOWN" are respectively appended with the corresponding prefectures bracketed. Then, the operator depresses the key "3" (401d) of the key board 203 to enter the geographical name at Step S308 which is displayed on the scope 206a of the CRT 206 through Step S309, as shown in FIG. 10F.

Thus, the execution of the subroutine S406 for retrieving the point information has been completed, and the program returns to Step S407 in FIG. 9D. Steps S407 and S408 respectively correspond to Steps S207 and S208 in FIG. 9B whereby the similar processing is executed. However, it should be noted that the positional information stored in the memories 505f-505h is set at the coordinates (Xg, Yg) of the destination point instead of the coordinates (Xs, Ys) of the departure point.

As in the foregoing, the execution of the subroutine S104 for setting the destination point has been completed.

Figure 9E:
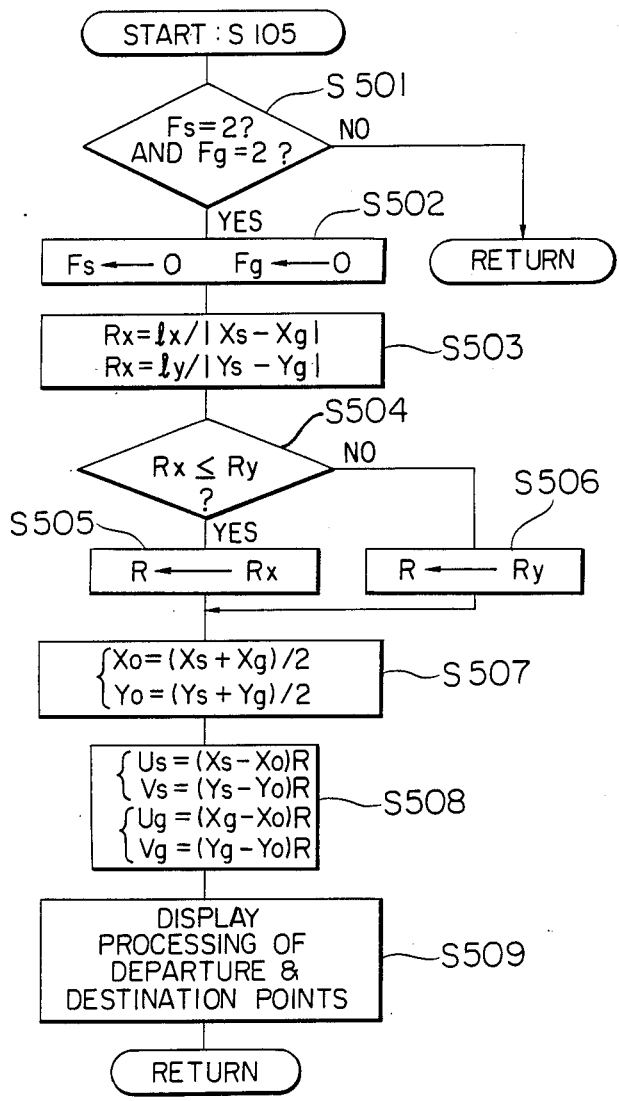

Subsequent to the setting processings of the departure point (subroutine S103) and the destination point (subroutine S104) having been executed, the memories Fs and Fg are both set to "2" at Steps S208 and S408 so that the mark display processing of the departure and the destination points (subroutine S105 in FIG. 9A) will be executed. The flow chart of this subroutine S105 is illustrated in FIG. 9E. Referring to FIG. 9E, if it is determined at Step S501 that the departure and the destination points are both set, the memories Fs and Fg are cleared to zero at Step S502. Then, a reduced scale is determined such that the marks of the departure and the destination points may be displayed on the outer periphery 206c of the rectangular zone 206b having a lateral length Lx and a longitudinal length Ly imaginarily preset on the scope 206a of the CRT 206 in FIG. 8. On the basis of this reduced scale, the departure mark and the destination mark are displayed.

Namely, supposing that the coordinates of the departure and the destination points be respectively (Xs, Ys) and (Xg, Yg) as shown in FIG. 6, at Step S503 a ratio $Rx=Lx/|Xs-Xg|$ of the lateral length Lx of the rectangular zone 206b to the distance $|Xs-Xg|$ between the departure point and the destination point in the east and west direction, and a ratio $Rx=Ly/|Ys-Yg|$ of the longitudinal length Ly of the rectangular zone 206b to the distance Ys−Yg between the departure point and the destination point in the south and north direction are determined, whereby Rx is compared to Ry at Step 504. If the result is Rx≦Ry, Rx is defined as the reduced scale R at Step S505 while if the result is Rx≧Ry, Ry is defined as the reduced scale R at Step S506.

Figure 11A:
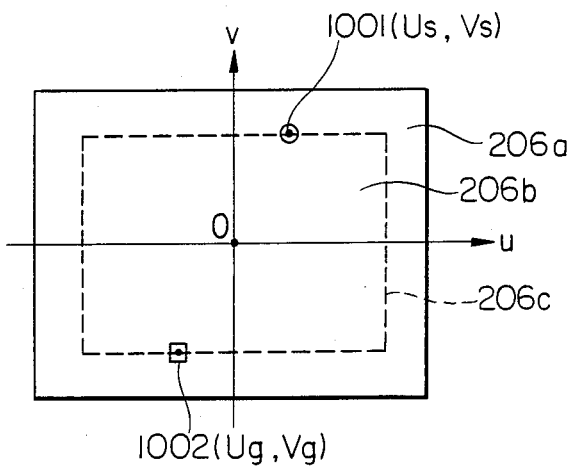
FIGS. 11A and 11B respectively show displayed examples indicating marks of departure and destination points as well as a vehicle's locus.

Then, the coordinates of the middle point between the departure point and the destination point is computed at Step S507. Then, at Step S508, the conversion of the coordinates and the reduction by the reduced scale R are computed on the basis of $$\begin{cases} Us = R(Xs - Xo) \\ Vs = R(Ys - Yo) \end{cases} \quad \begin{cases} Ug = R(Xg - Xo) \\ Vg = R(Yg - Yo) \end{cases}$$

so that the above middle point may correspond to the center, i.e., U=0, V=0 (the origin), of the rectangular zone 206b in order to obtain the coordinates (Us, Vs) of the departure point and the coordinates (Ug, Vg) of the destination point on the scope 206a. It is apparent that these coordinates (Us, Vs) and (Ug, Vg) are positioned on the outer periphery 206c of the rectangular zone 206b. Therefore, at Step S509, a departure mark 1001 and a destination mark 1002 are displayed respectively at the coordinates (Us, Vs) and (Ug, Vg) as shown in FIG. 11A.

Thus, after the mark 1001 of the departure point and the mark 1002 of the destination point have been displayed, the vehicle can begin to run. If the vehicle is positioned at the coordinates of the departure point entered, the operator immediately depresses the "START" key 402d on the key board 203. If the vehicle is positioned a little far from the coordinates of the departure point, the operator may depress the "START" key 402d when the vehicle has reached the coordinates (Xs, Ys) of the departure point.

Figure 9F:
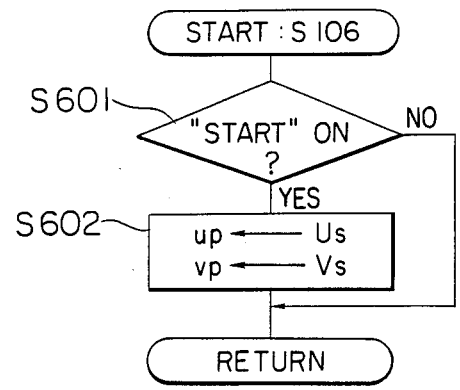

When the "START" key 402d is depressed, the subroutine S106 for the initializing processing of the current position shown in FIG. 9A is executed. FIG. 9F illustrates the flow chart of the subroutine S106 in which whether or not the operation of the "START" key 402d has been carried out is determined at Step S601, and if the answer is "yes", then the coordinates (Us, Vs) of the departure point are set in the memory region for coordinates "up" and "vp" used for an integral computation of the current position of the vehicle on the scope 206a.

Figure 9G:
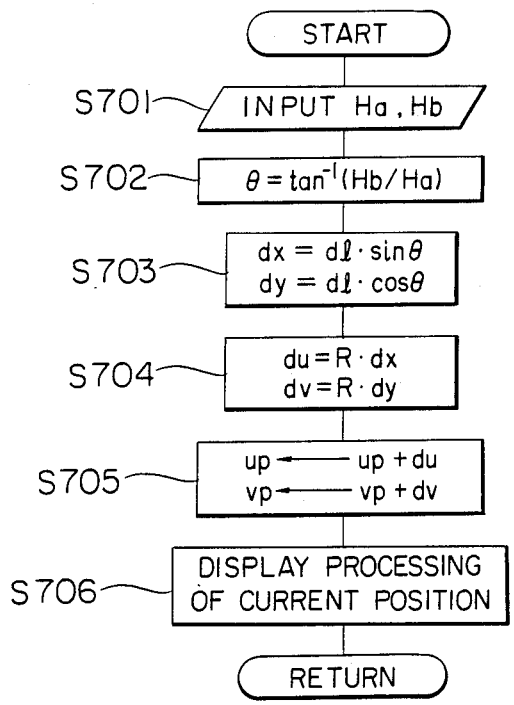

Thus, with the settings of the departure point, the destination point, and the initial values of the current postion having been completed and with the vehicle being driven, an interrupt command is inputted into the micro-computer of the control circuit 204 each time the running distance sensor 201 generates a pulse at an interval of a unit running distance dl (for example, 1 m), thereby executing an interrupt processing routine shown in FIG. 9G.

Figure 3:
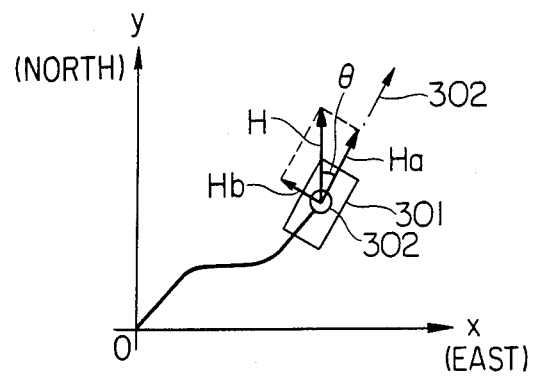
FIG. 3 shows a graph for explaining a heading sensor used in FIG. 2.
Figure 11B:
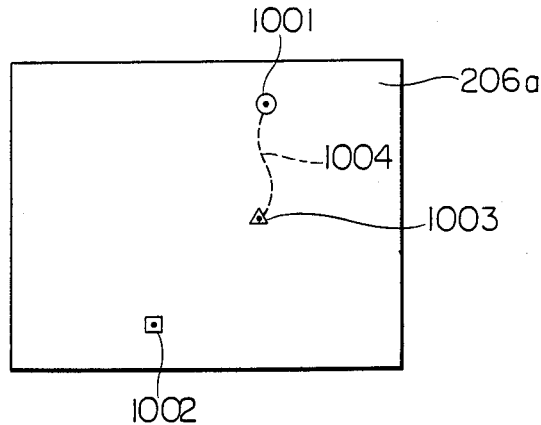

In FIG. 9G, heading signals Ha and Hb are inputted into the micro-computer of the control circuit 204 at Step 701, and an angle θ derived from the earth magnetism [H] (vector) shown in FIG. 3 and the vehicle heading 302 of the vehicle 301 is calculated at Step S702. Then, the directional components dx and dy per the unit running distance dl with respect to the coordinates x and y are calculated at Step S703, and the magnitudes of the movement du and dv of the current position on the scope 206a is calculated by taking into account the reduced scale R at Step S704. Then, at Step S705, the coordinates (up, vp) of the current position on the scope 206a is integrated, and at Step S706, the integrated result is displayed as shown in FIG. 11B wherein a numeral 1003 indicates the mark representative of the current position of the vehicle. It should be noted that a dotted line 1004 indicates a running locus of the distance travelled by the vehicle so far.

As above described, when the geographical names of the departure point and the destination point are entered, the control circuit 204 reads out the positional information of the points from among the pre-stored point information, and causes the CRT 206 to display the both points as marks in an adequately reduced scale and to continuously display, as a mark, the current position of the vehicle which is continuously computed and updated, whereby an on-board navigation function extremely suitable for an automobile is realized as follows:

(1) The picture information of an actual map is not stored in a semi-conductor memory 205 but instead point information consisting of the information of geographical names and the positional information thereof is stored as a basic unit whereby the information of geographical names over a wide range of areas can be stored.

(2) Since the character key group 401 in which one character key (for example, 401a) is assigned a plurality of unit characters (for example, "A", "I", "U", "E", and "O" as "A" row) is used, the number of character keys can be reduced so that the key board 203 can be made small-sized. Also, since "Kana" character is used as a unit character and one character key is assigned to each of "A", "KA", "SA", "TA", "NA", "HA", "MA", "YA" and "RA" rows, and one character key is assigned to "WA" and "N", it is possible to look for a character key in the same manner as looking for headings in a dictionary, resulting in the easy use thereof. Furthermore, since the ten character keys are also respectively assigned integers of 0 to 9, the number of the character keys can be further reduced.

Figure 10G:
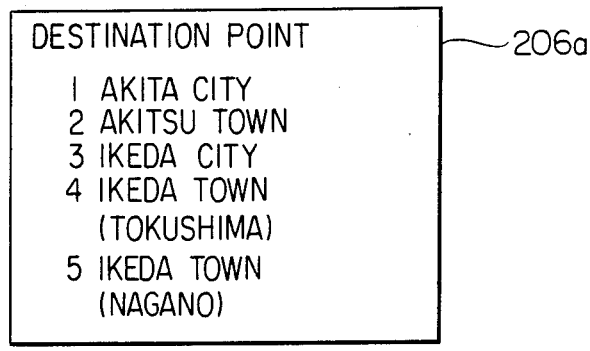

(3) Since the geographical name is retrieved with reference to the combinations of the unit character rows entered, if a plurality of geographical names are retrieved, those geographical names are once displayed on the CRT 206 so that an operator may select one of them to determine the geographical name, a disadvantage that one of the geographical names can not be determined due to one character key being assigned to a plurality of unit characters (hereinafter abbreviated as a multiple character assignment of key) is eliminated. Furthermore, in the embodiment of this invention, the information of the geographical names is divided into a name portion and an attribute portion in which the name portion is at first entered for the retrieval, and a plurality of name portions retrieved due to the above mentioned "multiple character assignment of key" are displayed so that the operator may select one of them to determine the name portion. Subsequently, if there are a plurality of geographical names having that name portion, they are displayed so that the operator may select one of them to determined the geographical name. Therefore, even though there are a plurality of geographical names having the same name portion, a desired geographical name can be readily set. Also, even in the case of a plurality of identical geographical names, only one of them can be determined by storing contents for distinguishing them in the memories 504e and 505e. While those distinguishing contents comprise "prefecture" in the above embodiment, in the case where there are a plurality of identical geographical names in the same prefecture, the memories 504e and 505e may store the name codes of prefectures to which the geographical names belong respectively. It should be noted that when the name portion (for example, "A" row, "KA" row, or "TA" row) is entered upon entering the geographical name, the corresponding geographical names are displayed as shown in FIG. 10G just after the retrieval so that the operator may select one of them. Also, if "Ikeda City" is desired to be set as a destination point, by entering not only the name portion but also the attribute portion at the same time in such a manner as "DESTINATION POINT" (402b), "A" row (401a), "KA" row (401b), "TA" row (401d), "SET" (402c), "SA" row (401c) which corresponds to "City" in this particular case, and "SET" (402c) with the control key 502 and the character key 401, "IKEDA CITY" can be readily retrieved immediately from the memory map shown in FIG. 7.

(4) The attribute portion of the geographical name does not include characters per se such as "City", "Ward", "Town", "Village" but includes the corresponding code thereof (for example, within 7 bits) so that the memory capacity for the attribute portion (for example, 501d) can be reduced.

(5) Since the marks 1001 and 1002, representative of the departure point and the destination point, determined from the distance therebetween and the relationship of their positions are displayed on adequate points on the scope 206a whereby on the reduced scale determined by those marks, the mark 1003 representative of the current position of the vehicle is displayed, the operator does not have to carry out complicated operations such as the position setting of the marks and the setting of the reduced scale.

While the main features of one embodiment of this invention has been described, other embodiments of this invention will now be described.

In a second embodiment, the English alphabet is used as unit characters used for the semiconductor memory 205 and the character key 401 in which two or three characters such as ABC, DEF, GHI, JKL, MNO, PQR, STU, VWX, and YZ are assigned to each character key. In this case, Japanese geographical names can also be stored or entered but the storage capacity as well as the number of operations must be increased as compared to the case where Japanese "Kana" alphabet is used. However, in the countries where English is used, the same effect as with the case where "Kana" alphabet is used in Japan will be gained. Also, by allowing the character keys to correspond to integers of 0 to 9 respectively, the number of the keys can be further reduced. Furthermore, with the key for "ABC" being assigned "2", the key "DEF" assigned "3", the key "GHI" assigned "4", the key "JKL" assigned "5", the key "MNO" assigned "6", the key "PRS" assigned "7", the key "TUV" assigned "8", the key "WXY" assigned "9", and the key "QZ" assigned "0" or "1", the same configuration as the dial of a telephone used in a part of the United States of America can be adopted, thereby improving the operability of this system especially in the United States.

In a third embodiment, the point information is divided into several groups of information respectively assigned to predetermined zones of Japan, e.g., predetermined districts or prefectures, and the divided information is pre-stored in the semiconductor memory 205. Upon retrieving the point information, a zone is designated by depressing the "zone" key (not shown) and the character key and a geographical name within the zone is then entered whereby the corresponding point is retrieved within the zone. According to this arrangement, redundant geographical information retrieved by the above "multiple character assignment of key" can be reduced, thereby shortening the retrieval time for the geographical name.

It should be noted that while in the above embodiments, the cases where the "multiple character assignment of key" and the same geographical name occur have been described with reference to the entry of geographical names, actually there are many cases other than the above described cases where a geographical name can be determined by only one name retrieved.

Also, in the above embodiments, the running distance detecting means 101 corresponds to the running distance sensor 201, the vehicle heading detecting means 102 corresponds to the heading sensor 202, the current position computing means 103 corresponds to Steps S701–S705 in FIG. 9G in the control circuit 204, the current position initializing means 104 corresponds to the "START" key in FIG. 4 and Steps S601 and S602 in FIG. 9F, the display means 105 corresponds to the CRT 206, the point information storage means 106 corresponds to the semiconductor memory 205, the character key group 107 is the same as the one shown by reference numeral 401 in FIG. 4, the geographical name entering means 108 corresponds to Steps S209–S211 in FIG. 9B and Steps S409–S411 in FIG. 9D, the point information retrieval means 109 corresponds to Steps S301–S309 in FIG. 9C, the point setting means 110 corresponds to the subroutines S103 and S104 in FIG. 9A, particularly Steps S201–S208 in FIG. 9B and Steps S401–S408 in FIG. 9D, and the mark displaying control means 111 corresponds to Steps S501–S509 in FIG. 9E.

As described above, the automotive navigation system according to this invention can store point information over a wide range of zones while one character key is assigned to a plurality of unit characters, so that on-board suitability having a small-size, a low cost and a good operability can be achieved, thereby realizing a sufficiently practical navigation system.

It is to be noted that while the present invention has been described with reference to the above embodiments illustrated in the accompanying drawings, it should not be limited to them and may be applied with various modifications thereof without departing from the spirit of the invention.

What is claimed is:

1. An automotive navigation system comprising:
a running distance detecting means for detecting the running distance of a vehicle;
a vehicle heading detecting means for detecting the heading of the vehicle;
a display means for enabling a planar display based on the two dimensional Cartesian coordinates system;
a storage means for storing information comprising a geographical name and the positional information thereof for each of a plurality of points;
a character keyboard means including a plurality of character keys respectively assigned a group of unit characters; and
a control means for computing the current position of the vehicle on the basis of the output signals of said running distance detecting means and said vehicle heading detecting means, for retrieving from said storage means one or more geographical names on the basis of the order in which the character keys are activated, for designating from among the retrieved geographical names the geographical name of a departure point and a destination point and reading out their corresponding positional information from said storage means, and for causing said display means to display as marks the departure point, the destination point, and the current position of the vehicle in a reduced scale determined by the departure and destination points at corresponding coordinates on said display means.

2. An automotive navigation system according to claim 1 wherein said control means comprises:
a current position computing means for computing the current position of the vehicle from the running distance detected by said running distance detecting means and the vehicle heading detected by said vehicle heading detecting means;
a current position initializing means for initializing the current position of the vehicle for said current position computing means;
a geographical name entering means for entering, by the activation of said character keys, information corresponding to the geographical name of a point which an operator desires;
a point information retrieval means for retrieving geographical names from said storage means based on the combinations and the order that said character keys are activated, causing said display means to display all of the geographical names corresponding to the inputted combinations thereby allowing the operator to select one of the displayed geographical names to determine the desired geographical name in a case where a plurality of the geographical names are retrieved, and reading out and setting the positional information of the selected geographical name;
a point setting means for setting said departure point and said destination point provided by said point information retrieval means; and
a mark displaying control means for determining the distance and the positional relationship between said departure and destination points from the positional information of said departure and destination points provided by said point setting means and causing said display means to display said marks respectively representative of the positions of said departure and destination points based on said determined distance and positional relationship, whereby on the reduced scale determined by said departure and destination points a mark representative of the current position of the vehicle is displayed on said display means.

3. An automotive navigation system according to claim 2 wherein the point information stored in said storage means is divided into a name portion representing said geographical name and an attribute portion representing the attribute of said geographical name, said geographical name entering means including means for entering information corresponding to one or more of the name portions, said point information retrieval means including means for retrieving all of said name portions corresponding to said entered information, means for causing said display means to display all of said retrieved name portions if there are a plurality of name portions corresponding to the entered information, and means for causing said display means to further display the attribute portion of geographical names having identical name portions thereby allowing the operator to select one of said retrieved name portions to determine one of said departure and destination points.

4. An automotive navigation system according to claim 3 wherein said storage means includes means for storing said point information divided into predetermined areas, whereby an area is first designated and the geographical name within said area is entered thereby allowing the corresponding positional information to be retrieved from said storage means.

* * * * *